(12) United States Patent
Nagata

(10) Patent No.: US 6,496,659 B2
(45) Date of Patent: Dec. 17, 2002

(54) CAMERA

(75) Inventor: Kazuaki Nagata, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/949,805

(22) Filed: Sep. 12, 2001

(65) Prior Publication Data

US 2002/0031354 A1 Mar. 14, 2002

(30) Foreign Application Priority Data

Sep. 12, 2000 (JP) ........................................ 2000-276534

(51) Int. Cl.[7] ................................................ G03B 17/02

(52) U.S. Cl. ...................................................... 396/535

(58) Field of Search ......................................... 396/535

(56) References Cited

U.S. PATENT DOCUMENTS

| | | | | |
|---|---|---|---|---|
| 5,697,005 A | * | 12/1997 | Kikuchi | 396/535 |
| 5,708,898 A | * | 1/1998 | Manabe et al. | 396/535 |
| 5,974,264 A | * | 10/1999 | Manabe et al. | 396/535 |
| 6,058,274 A | | 5/2000 | Omiya | 396/535 |

* cited by examiner

*Primary Examiner*—David M. Gray
(74) *Attorney, Agent, or Firm*—Birch, Stewart, Kolasch & Birch, LLP

(57) ABSTRACT

The outer covering of the camera can be machined and molded with high dimensional accuracy and has high rigidity by forming reinforcing portions by drawing at the top and bottom of a metal cover which constitutes a curved surface of the outer covering. The reinforcing portions are integrally formed by drawing at the top and bottom of the grip portion of the metal grip cover formed in an arcuate shape. This allows a curved surface portion to be machined and molded with high dimensional accuracy. The machined metal cover can obtain high rigidity by the reinforcing portions.

4 Claims, 5 Drawing Sheets

CAMERA

BACKGROUND OF THE INVENTION

1. Field of the Invention

The present invention relates to a camera, and more particularly, to a camera whose outer covering partly comprises a metal cover.

2. Description of the Related Art

An outer covering of a camera is mainly made from plastic and metal. The plastic has features of easy reproducibility of a complex shape and a light weight but has a drawback of susceptibility to an impact or a flaw. On the other hand, the metal has a quality appearance and a feature of touch and texture specific to the metal but has a drawback in machinability.

For imparting a quality appearance to a camera, a metal outer covering is generally used, but there is a disadvantage of very high manufacturing cost if the whole outer covering is made from metal. U.S. Pat. No. 6,058,274 discloses an outer covering may be configured in such a manner that the whole outer covering is made from plastic and that a metal cover formed by machining a metal plate is mounted to part thereof.

In recent years, a variety of appearance designs of cameras has been increased, and there is also a design using a curved surface as well as a simple box shape.

However, when a curved surface portion of an outer covering is constituted by a metal cover, there is a disadvantage of difficulty in obtaining dimensional accuracy of the curved surface portion, which leads to difficulty in machining and molding. When forming the curved surface portion simply by curving a metal plate, there is also a disadvantage of a reduction in rigidity.

SUMMARY OF THE INVENTION

The present invention is made in view of the above circumstances, and its object is to provide a camera which can be machined and molded with high dimensional accuracy and has high rigidity.

In order to attain the above object, the present invention is directed to a camera, comprising: an outer covering; and at least one metal cover which is mounted between top and bottom surfaces of the outer covering, wherein at least part of the metal cover is formed with a curved surface to constitute an appearance surface of the outer covering, wherein reinforcing portions are integrally formed by drawing at the top and bottom of the portion formed with the curved surface, the reinforcing portions being disposed inside the top and bottom surfaces when the metal cover is mounted between the top and bottom surfaces.

According to the present invention, integrally forming the reinforcing portions by drawing at the top and bottom of the curved surface formed on the metal cover allows the curved surface portion to be machined and molded with high dimensional accuracy. The machined metal cover can obtain high rigidity by the reinforcing portions. The reinforcing portions do not appear outwardly and thus do not detract from the appearance of the camera.

Preferably, at least one of the reinforcing portions has a positioning hole; and at least one of the top and bottom surfaces of the outer covering has a positioning pin which is fitted in the positioning hole formed in the reinforcing portion to position the metal cover.

According to the present invention, using the positioning hole formed on the reinforcing portion allows the metal cover to be easily mounted to a normal position when mounting the metal cover. The reinforcing portion does not appear outwardly and thus does not detract from the appearance of the camera.

Furthermore, the reinforcing portion can be fastened with a screw to at least one of the top and bottom surfaces of the outer covering to secure the metal cover.

According to the present invention, the reinforcing portion does not appear outwardly, and thus the metal cover can be mounted without detracting from the appearance of the camera.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

A preferred embodiment of a camera according to the present invention will be described below with reference to the drawings.

Figure 1:
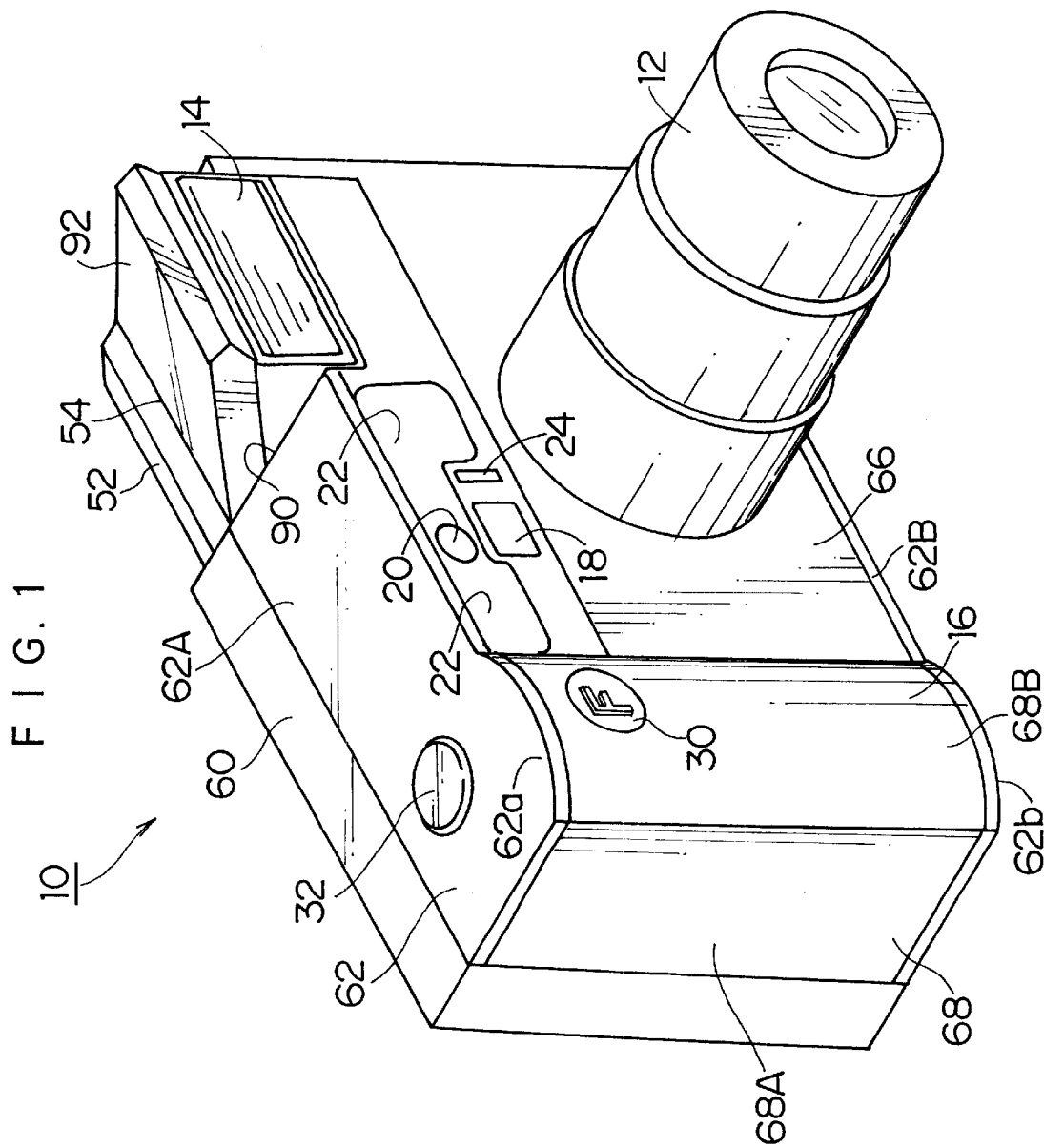
FIG. 1 is a front perspective view of an appearance of a camera according to an embodiment of the present invention.
Figure 2:
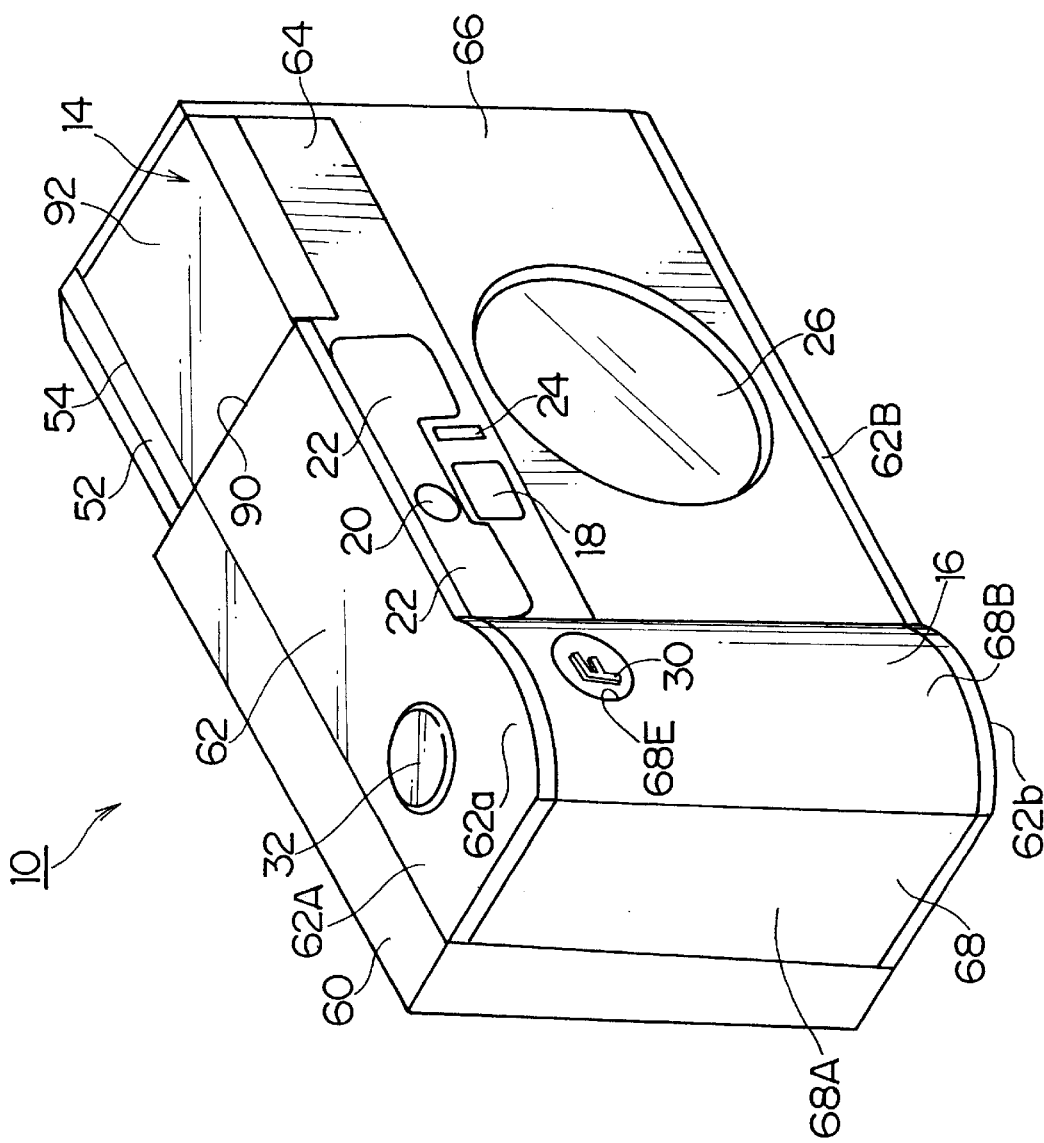
FIG. 2 is a front perspective view of the appearance of the camera according to the embodiment.

FIGS. 1 and 2 are front perspective views of appearance configurations of a camera to which the present invention is applied. A camera 10 shown in the figure is an APS camera and is provided, on its front surface, with a lens barrel 12, electric flash 14, grip 16, finder window 18, AE light receiving window 20, AF windows 22, 22 and self-timer lamp 24.

The lens barrel 12 is provided substantially in the center of the front surface of the camera 10 and has a zoom function. The lens barrel 12 is of the collapsible barrel type and is extended when the camera 10 is switched on, and collapsed when the camera 10 is switched off. When the lens barrel 12 is collapsed, the front surface of the camera 10 becomes flattened, and a lens barrier 26 is shut in front of the collapsed lens barrel 12.

The electric flash 14 is provided on an upper right corner of the front surface of the camera 10. The electric flash 14 is of the pop-up type and is pivoted to be raised up when the camera 10 is switched on, and accommodated in a camera body when the camera 10 is switched off.

The grip 16 is formed with a predetermined width on a left edge of the front surface of the camera 10. The grip 16 is formed with a forward arcuate bulge, and around a top end of the front surface, a circular nameplate 30 is provided. Further, a shutter button 32 is provided on a top surface of the grip 16, and an unshown cartridge cap is provided on a bottom surface of the grip 16.

The finder window 18 is provided above the lens barrel 12, and the AE light receiving window 20 is provided above the finder window 18. The AF windows 22, 22 are provided so as to sandwich the AE light receiving window 20, and the self-timer lamp 24 is provided on the right of the finder window 18.

Figure 3:
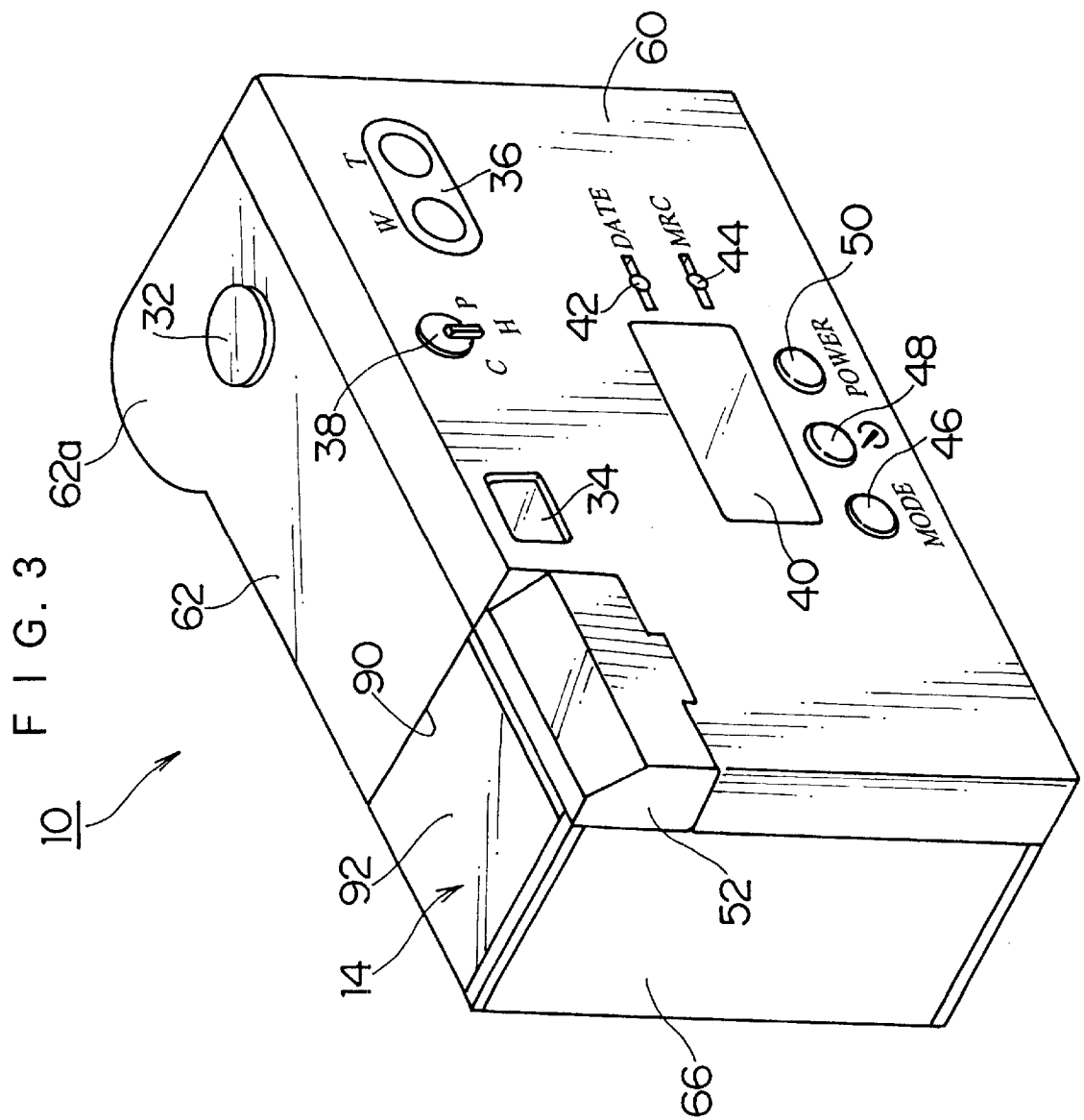
FIG. 3 is a back perspective view of the appearance of the camera according to the embodiment.

FIG. 3 is a back perspective view of the appearance configuration of the camera to which the present invention is applied. As shown in the figure, provided on a back surface of the camera 10 are a finder ocular window 34, zoom lever 36, print type switching knob 38, liquid crystal panel 40, date button 42, MRC button 44, mode button 46, self-timer button 48, power button 50 and battery cap 52.

The zoom lever 36 is provided on an upper right corner of the back surface of the camera 10, and by operating the zoom lever 36, zooming is carried out.

The print type switching knob 38 is provided on a left side of the zoom lever 36, and by operating the print type switching knob 38, print types can be switched among a conventional type (C), high vision type (H) and panorama type (P).

The liquid crystal panel 40 is formed in a rectangular shape and provided substantially in the center of the back surface of the camera body. Displayed on the liquid crystal panel 40 are the number of exposures, taking mode, cartridge mark, self-timer mode, battery capacity, date, kinds of film, sensitivity of film, or the like.

The date button 42 is disposed on the right of the liquid crystal panel 40, and by operating the date button 42, writing of the date is selected. The MRC button 44 is similarly disposed on the right of the liquid crystal panel 40, and by operating the MRC button 44, halfway replacement of the film is selected.

The mode button 46, self-timer button 48, power button 50 are disposed in parallel below the liquid crystal panel 40. By operating the mode button 46, the taking mode is selected, and by operating the self-timer button 48, the self-timer function is selected. By operating the power button 50, the camera 10 is switched on/off.

The battery cap 52 is disposed backward of the electric flash 14, and pivoted via a hinge to be opened/closed. At this time, the battery cap 52 is opened/closed by hooking a nail or the like onto a clearance 54 formed between the battery cap 52 and electric flash 14.

Figure 4:
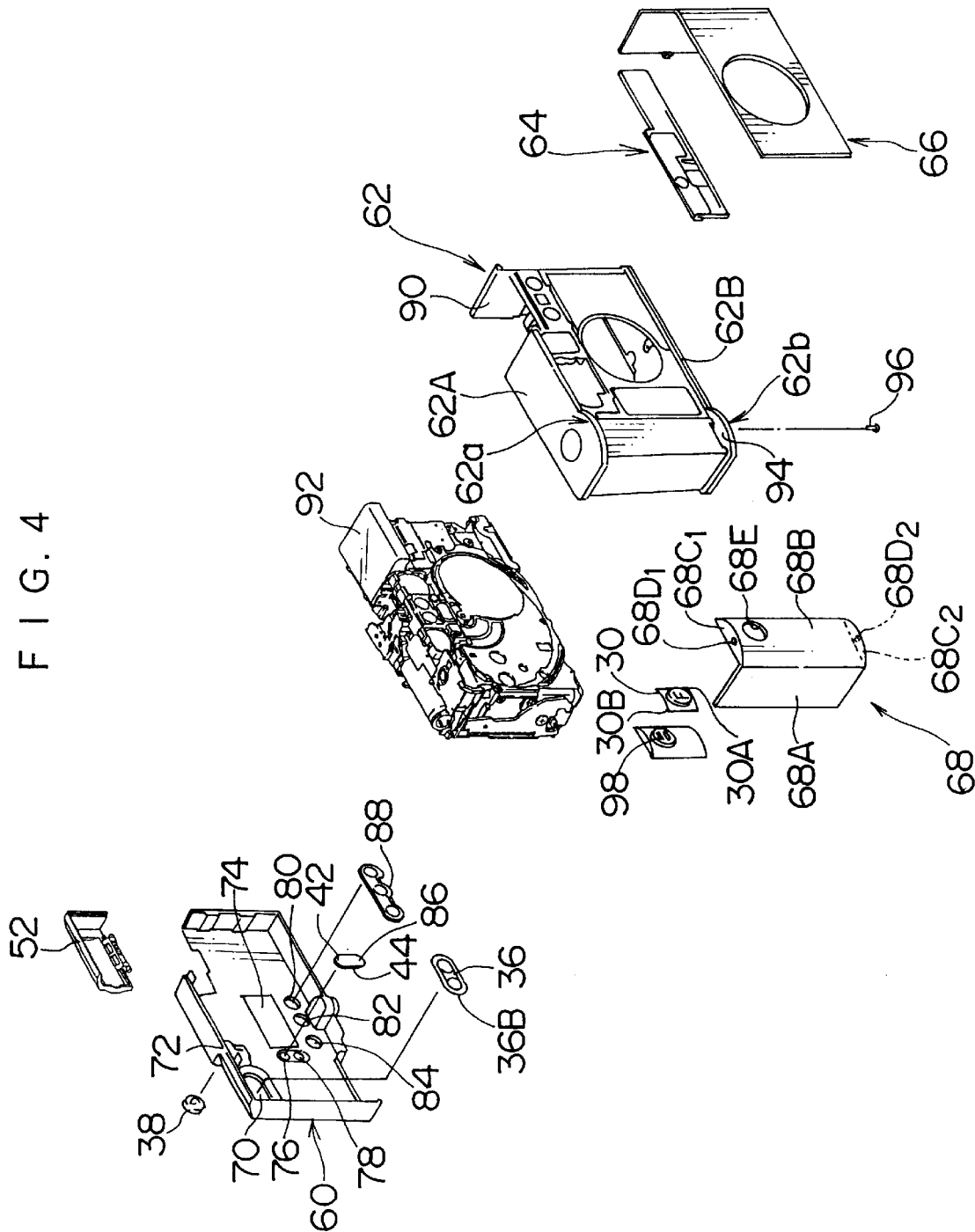
FIG. 4 is an exploded perspective view of the camera according to the embodiment.

FIG. 4 is an exploded perspective view of the camera to which the present invention is applied. As shown in the figure, the outer covering which covers a camera body 56 mainly comprises a rear cover 60, front cover 62, acrylic cover 64, metal cover 66 and grip cover 68.

The rear cover 60 is formed from plastic. Formed on a back surface of the rear cover 60 are an opening for zoom lever 70, opening for print type switching knob 72, opening for liquid crystal panel 74, opening for date button 76, opening for MRC button 78, opening for mode button 80, opening for self-timer button 82 and opening for power button 84. Various kinds of buttons disposed on the back surface of the camera 10 are fitted in their respective corresponding openings to be mounted thereto. That is, the zoom lever 36 is fitted in the opening for zoom lever 70 to be mounted thereto; the print type switching knob 38, in the opening for print type switching knob 72; the liquid crystal panel 40, in the opening for liquid crystal panel 74; the date button 42, in the opening for date button 76; the MRC button 44, in the opening for MRC button 78; the mode button 46, in the opening for mode button 80; the self-timer button 48, in the opening for self-timer button 82; and the power button 50, in the opening for power button 84.

Both of the date button 42 and MRC button 44 are formed from rubber and integrally formed with a predetermined space on a base member 86. For this reason, mounting of the date button 42 and MRC button 44 to the rear cover 60 is carried out by fitting the integrated date button 42 and MRC button 44 in the opening for date button 76 and opening for MRC button 78, respectively, from inside the rear cover 60. For the integral piece of the date button 42 and MRC button 44 thus mounted, the date button 42 and MRC button 44 only project from the opening for date button 76 and opening for MRC button 78 to be exposed on an outer surface of the rear cover 60.

The mode button 46, self-timer button 48, power button 50 are similarly formed form rubber and integrally formed with a predetermined space on a base member 88. For this reason, mounting of the mode button 46, self-timer button 48 and power button 50 to the rear cover 60 is carried out by fitting the integrated mode button 46, self-timer button 48 and power button 50 in the opening for mode button 80, opening for self-timer button 82 and opening for power button 84, respectively, from inside the rear cover 60. For the integral piece of the mode button 46, self-timer button 48 and power button 50 thus mounted, the mode button 46, self-timer button 48 and power button 50 only project from the opening for mode button 80, opening for self-timer button 82 and opening for power button 84 to be exposed on the outer surface of the rear cover 60.

The zoom lever 36 is formed with a flange 36B at its outer peripheral edge, and when the zoom lever 36 is mounted to the opening for zoom lever 70 from inside the rear cover 60, the zoom lever 36 only projects from the opening for zoom lever 70 to be exposed on the outer surface of the rear cover 60.

Now, when the rear cover 60 mounted with various kinds of operation buttons or the like as described above is mounted to the camera body 56, the outer surface of the rear cover 60 as it is constitutes an appearance of the camera 10. For this reason, the outer surface of the rear cover 60 is coated with rubber and treated to be matted.

On the other hand, for the various kinds of operation buttons provided on the outer surface of the rear cover 60 which is thus matted, their respective surfaces are treated to be smooth. That is, the outer surfaces of the zoom lever 36, mode button 46, self-timer button 48 and power button 50 are treated to be smooth.

As described above, the mode button 46, self-timer button 48, and power button 50 are integrally formed on the base member 88, and the integral piece is treated to be smooth at portions appearing on the outer surface of the rear cover 60 only, that is, the buttons only. Similarly, the zoom lever 36 is treated to be smooth at portions appearing on the outer surface of the rear cover 60 only, that is, the buttons only.

The integral piece of the mode button 46, self-timer button 48, power button 50 is molded by pouring rubber into a predetermined mold, and at this time, by polishing portions of the mold corresponding to the buttons, the buttons only of the molded integral piece can be treated to be smooth.

The front cover 62 is formed from plastic similarly to the rear cover 60. A top surface 62A and bottom surface 62B only of the front cover 62 constitute an appearance of the camera 10, and top and both side surfaces thereof are mounted with the acrylic cover 64, metal cover 66 and grip cover 68 to be covered with them. The top surface 62A and bottom surface 62B which constitute an appearance surface are coated with rubber and treated to be matted similarly to the rear cover 60.

An opening for electric flash 90 is formed on a right corner of the top surface 62A of the front cover 62, and an electric flash cover 92 of the electric flash 14 provided in the camera body 56 is fitted in the opening for electric flash 90. The electric flash cover 92 is formed from plastic, and its outer surface is coated with rubber and treated to be matted similarly to the front cover 62.

The metal cover 66 is formed into L shape by machining an aluminum plate, and its surface is anodized. The metal cover 66 is mounted so as to cover the front and right side surfaces of the front cover 62.

The front cover 62 to which the metal cover 66 is mounted is formed such that the top surface 62A and bottom surface 62B project by the length corresponding to the thickness of the metal cover 66 or the thickness plus about 0.2 mm. The metal cover 66 is mounted so as to be fitted between the top surface 62A and bottom surface 62B of the front cover 62 thus formed in a projecting manner.

When top and bottom end surfaces of the metal cover 66 extend beyond the top surface 62A and bottom surface 62B of the front cover 62 by errors in shape or mounting of the front cover 62 and metal cover 66, there is a possibility of detracting from the appearance of the camera, therefore, the top surface 62A and bottom surface 62B of the front cover 62 are preferably formed so as to project the length slightly larger than the thickness of the metal cover 66.

The metal cover 66 is secured to the front cover 62 by a double-faced adhesive tape or an adhesive.

Figure 5:
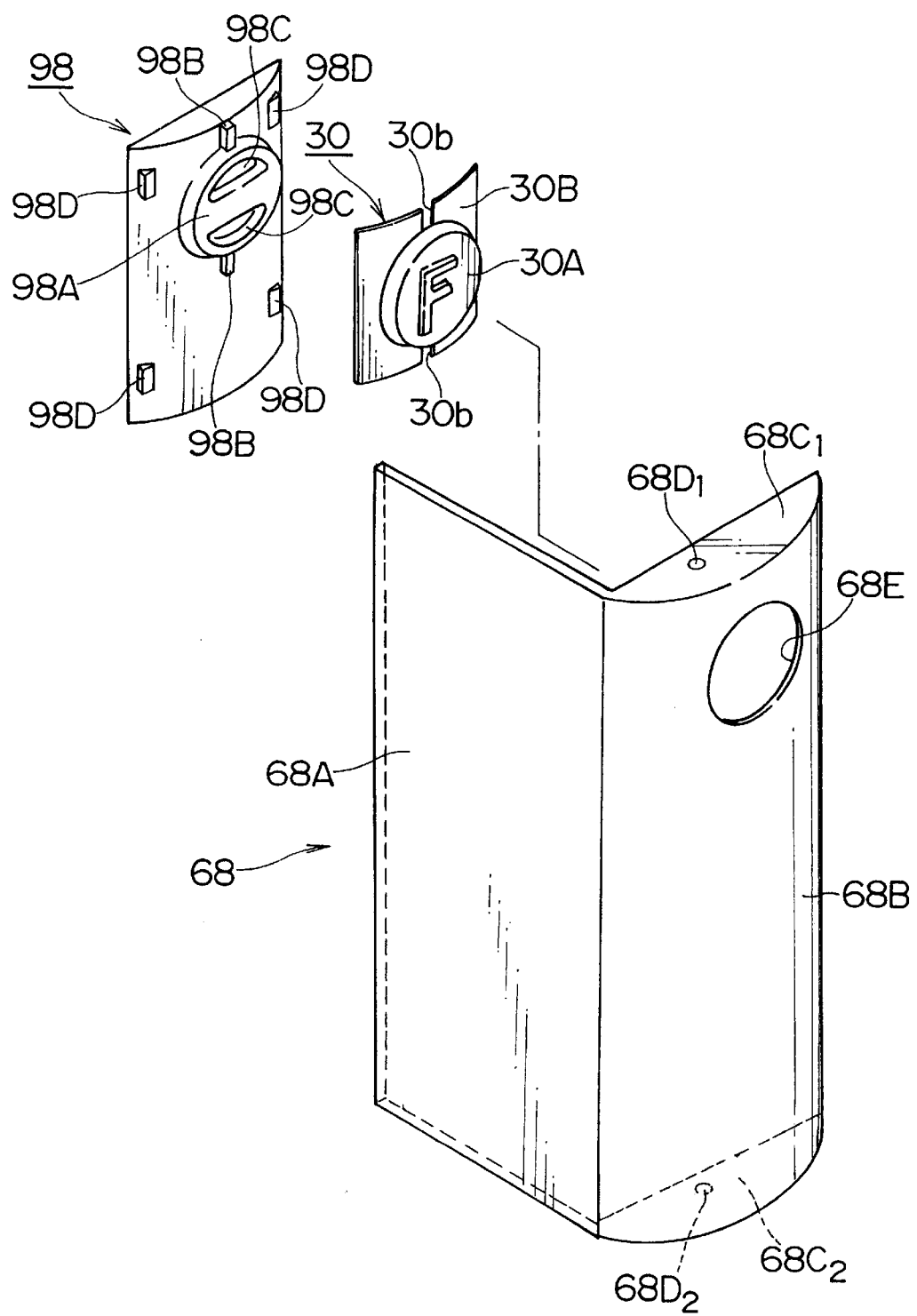
FIG. 5 is a perspective view of configurations of a nameplate and grip cover.

The grip cover 68 is similarly formed by machining an aluminum plate, and its surface is anodized. The grip cover 68 is, as shown in FIG. 5, constituted by a side portion 68A and grip portion 68B and mounted so as to surround a left side portion and front grip portion of the front cover 62.

The side portion 68A is formed in the shape of a rectangular plate, and the left side of the front cover 62 is covered with the side portion 68A.

On the other hand, the grip portion 68B is formed in an arcuate shape, and at the top and bottom thereof, crescent reinforcing portions $68C_1$ and $68C_2$ are formed, respectively. The reinforcing portions $68C_1$ and $68C_2$ are integrally molded with the top and bottom of the grip portion 68B by drawing, respectively. A positioning hole $68D_1$ is formed in the upper reinforcing portion $68C_1$, and a screw hole $68D_2$ is formed in the lower reinforcing portion $68C_2$.

The front cover 62 to which the grip cover 68 is mounted is formed, at its top surface 62A, with a protruding portion 62a in an arcuate shape, and an unshown positioning pin is formed in a projecting manner on a lower surface of the protruding portion 62a. When the grip cover 68 is mounted to the front cover 62, the positioning pin is fitted in the positioning hole $68D_1$ formed in the upper reinforcing portion $68C_1$. This allows the grip cover 68 to be correctly mounted to a normal position.

The front cover 62 is also formed, at its bottom surface 62B, with a similar arcuate protruding portion 62b, and a screw hole 94 is formed in the protruding portion 62b. When the grip cover 68 is mounted to the front cover 62 as described above, the screw hole $68D_2$ formed in the lower reinforcing portion $68C_2$ is positioned coaxially with the screw hole 94 formed in the protruding portion 62b. The screw 96 is screwed in the screw holes $68D_2$, 94 from the bottom surface side of the front cover 62, which secures the grip cover 68 to the front cover 62.

The grip portion 68B of the grip cover 68 is formed with a circular nameplate mounting hole 68E, and the nameplate 30 is mounted to the nameplate mounting hole 68E via a mounting plate 98.

A surface of the mounting plate 98 for mounting the nameplate 30 is, as shown in FIG. 5, formed in an arcuate shape along the shape of the grip portion 68B and has a mounting portion 98A in a disk shape around the top.

On the other hand, the nameplate 30 is formed by electroforming, and as a whole, formed so as to be curved in an arcuate shape along the shape of the grip portion 68B. The nameplate 30 comprises a nameplate portion 30A in a disk shape and a flange 30B, and is mounted to the mounting plate 98 by fitting the nameplate portion 30A to the mounting portion 98A of the mounting plate 98. That is, the nameplate portion 30A of the nameplate 30 is formed, in an embossed manner, on the flange 30B, and its back surface is hollow along the projecting shape of the front surface. Therefore, by fitting the hollow portion of the back surface to the mounting portion 98A of the mounting plate 98, the nameplate 30 is mounted to the mounting plate 98.

The flange 30B of the nameplate 30 is formed with notches 30b, 30b at its top and bottom positions, and the notches 30b, 30b are fitted to positioning projections 98B, 98B formed on the surface of the mounting plate 98. This allows the nameplate 30 to be mounted straight to a normal position of the mounting plate 98.

The mounting portion 98A of the mounting plate 98 is formed with a pair of through holes 98C, 98C. The nameplate 30 mounted to the mounting plate 98 is secured to the surface of the mounting plate 98 by pouring the adhesive from the back side into the through holes 98C, 98C.

Then, the nameplate 30 mounted to the mounting plate 98 as described above is, as shown in FIG. 4, mounted to the grip portion 68B by fitting the nameplate portion 30A in the nameplate mounting hole 68E formed in the grip portion 68B. At this time, the mounting plate 98 is secured to the inner surface of the grip portion 68B by applying the adhesive to legs 98D, 98D, . . . formed on the four corners of the surface.

The acrylic cover 64 is formed from acrylic and mounted so as to cover the upper portion of the front surface of the front cover 62. The acrylic cover 64 is translucently formed as a whole, and portions covering the finder window 18 and electric flash 14 are transparently formed.

As described above, the front cover 62 is mounted with the acrylic cover 64, metal cover 66 and grip cover 68, and this integral piece is mounted to the front surface of the camera body 56. Then, the front cover 62 mounted to the camera body 56 is made integral with the rear cover 60 mounted to the back surface of the camera body 56 to constitute the outer covering of the camera 10.

In the camera 10 configured as described above, the section of the grip 16 is formed with the arcuately curved surface. The section of the grip 16 configured with the curved surface is constituted by the aluminum grip cover 68 which constitutes the outer covering.

The grip cover 68 is formed with the arcuate grip portion 68B by machining the aluminum plate, and at the top and bottom of the grip portion 68B formed in the arcuate shape, the reinforcing portions $68C_1$, $68C_2$ are integrally molded by drawing.

By thus drawing the reinforcing portions $68C_1$, $68C_2$ at the top and bottom of the grip portion 68B, the grip portion 68B formed with the curved surface can have high rigidity.

Further, by thus drawing the reinforcing portions $68C_1$, $68C_2$ at the top and bottom of the grip portion 68B, the curved surface portion can be machined and molded with high dimensional accuracy.

Further, the grip cover 68 can be positioned on the front cover 62 using the positioning hole $68D_1$ formed in the reinforcing portion $68C_1$, and can be secured to the front cover 62 using the screw hole $68D_2$ formed in the reinforcing portion $68C_2$, thereby permitting easy assembly.

Further, when mounted to the front cover 62, the reinforcing portions $68C_1$, $68C_2$ are disposed inside the top surface 62A and bottom surface 62B of the front cover 62 and do not appear outwardly and thus do not detract from the appearance of the camera 10.

As described above, according to the present invention, the curved surface portion can be machined and molded with high dimensional accuracy by integrally forming the reinforcing portions by drawing at the top and bottom of the curved surface formed on the metal cover. The machined metal cover can also obtain high rigidity by the reinforcing portions. Further, the reinforcing portions do not appear outwardly and thus do not detract from the appearance of the camera.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera, comprising:

an outer covering; and at least one metal cover which is mounted between top and bottom surfaces of the outer covering, wherein at least part of the metal cover is formed with a curved surface to constitute an appearance surface of the outer covering, wherein reinforcing portions are integrally formed by drawing at the top and bottom of the portion formed with the curved surface, the reinforcing portions being disposed inside the top and bottom surfaces when the metal cover is mounted between the top and bottom surfaces.

2. The camera according to claim 1, wherein the reinforcing portion is fastened with a screw to at least one of the top and bottom surfaces of the outer covering to secure the metal cover.

3. The camera according to claim 1, wherein:

at least one of the reinforcing portions has a positioning hole; and at least one of the top and bottom surfaces of the outer covering has a positioning pin which is fitted in the positioning hole formed in the reinforcing portion to position the metal cover.

4. The camera according to claim 3, wherein the reinforcing portion is fastened with a screw to at least one of the top and bottom surfaces of the outer covering to secure the metal cover.

* * * * *